UNITED STATES PATENT OFFICE.

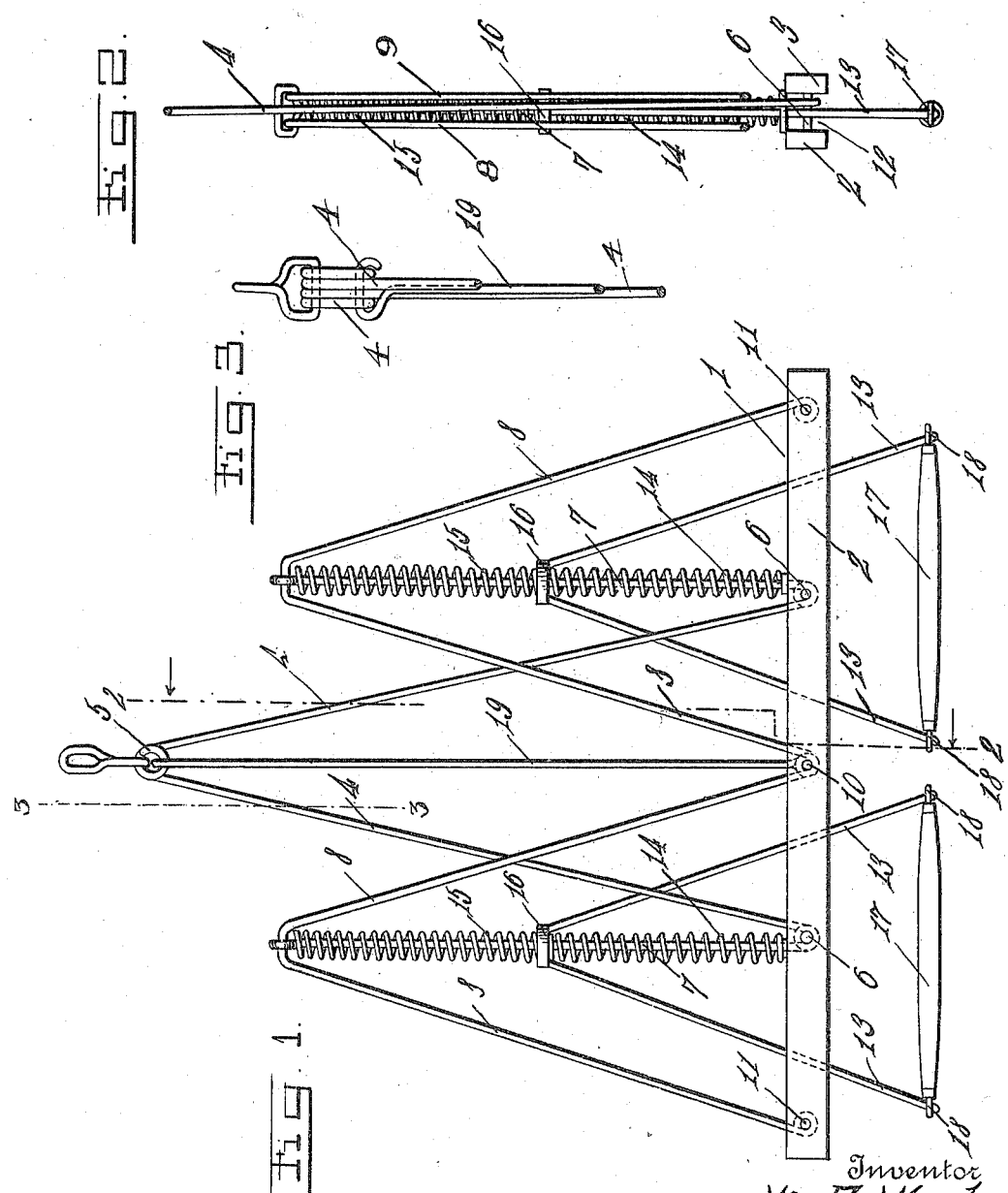

WILLIAM E. WOODS, OF GRIFFIN, INDIANA.

DOUBLETREE.

951,715. Specification of Letters Patent. Patented Mar. 8, 1910.

Application filed August 25, 1909. Serial No. 514,574.

*To all whom it may concern:*

Be it known that I, WILLIAM E. WOODS, a citizen of the United States, residing at Griffin, in the county of Posey and State of Indiana, have invented certain new and useful Improvements in Doubletrees; and I do declare the following to be a full, clear, and exact description of the invention, such as will enable others skilled in the art to which it appertains to make and use the same.

My invention relates to draft devices and particularly to double trees.

The object of the invention is the provision of a novel device of this character which will absorb the shocks and prevent sore shoulders on the draft animals. It will also obviate the difficulty experienced in moving a heavy load directly which frequently makes horses balky.

A further object of the invention is the provision of a novel double tree, tension springs so connected as to absorb the shocks and further novel means for supporting and bracing the spring members whereby they will operate properly at all times.

With these and other objects in view, the invention consists of certain novel features of construction, combination and arrangement of parts as will be more fully described and particularly pointed out in the appended claims.

In the drawings, Figure 1 is a top plan view showing the device applied to the tongue of the vehicle; and Fig. 2 is a section taken on line 2—2 of Fig. 1. Fig. 3 is an enlarged detail section on the line 3—3 of Fig. 1.

Referring more especially to the drawings, 1 represents the double tree which is composed of separate halves 2 and 3, lying one above the other and secured together as will hereinafter be described. Projecting rearwardly from the double tree are converging strain rods 4, which connect at their rear end as at 5 to form a coupling for a suitable clevis or to connect directly with the king bolt. These rods 4, are connected to the double tree by bolts 6, which also connect the spring slides 7. The slides 7, are provided at their forward ends with eyes to receive the bolts and are connected at their rear ends to converging pairs of brace rods 8 and 9, which are formed in a substantially V-shaped loop with their inner ends connected to the center bolt 10 and their outer ends secured to the double tree by bolts 11. The rods 4, 8 and 9, are all passed between the members 2 and 3, of the double tree 1 and thereby form a space 12 which permits the passage of the swingle tree links 13, which will hereinafter be described.

Surrounding the spring slides 7 are the compression springs 14 and the pull springs 15, the latter being somewhat stronger than the former and being connected at their outer ends to the brace rods 8 and 9. Intermediate these springs, there is slidably mounted upon the slides 7, the collars 16 to which the links 13, are connected and to which the springs are connected so that upon a forward movement of the collar 16, the springs 14 will be comprssed and the springs 15 will be pulled out. In the rearward movement of the collar, the reverse operation will take place. These links diverge from the collars 16, and pass between the members 2 and 3 of the double tree 1, and are connected at their outer ends to the extremities of the swingle trees 17. Suitable clevises or trace connectors 18, are secured upon the ends of the swingle trees to the ends of the links 13, whereby heavy swingle trees may be dispensed with and the swingle trees used as mere braces to keep the trace connectors 18 separated.

The rod 19 is shown extending from the bolt 10 to the connection 5 and this is used in certain instances where the double tree is employed for agricultural machinery and the like but is so connected as to be removable and when the device is in use upon a wagon or the like, may be dispensed with.

It will clearly be understood that while I have shown the device adapted for a double team, it may be constructed so as to be applicable for a greater number of horses, as such are required by adding additional strain rods 4.

From the foregoing description, taken in connection with the accompanying drawings, the construction and operation of the invention will be readily understood without requiring a more extended explanation.

Having thus described my invention, what I claim is:—

1. A double tree comprising a pair of connected members, strain rods extending therefrom and adapted to be connected to a vehicle, swingle trees, resilient members connected to the double tree, and direct connections which are guided by the double tree between the resilient members and the swingle trees.

2. A device of the class described comprising a double tree, strain members extending therefrom and adapted to connect with a vehicle, bracing members at each end of the double tree, guide members connected to the double tree and the brace members, springs carried by the double tree and the brace members, swingle trees, and direct connections which are guided by the double tree between the swingle trees and the springs.

3. A device of the class described comprising a pair of separated members, strain rods connected to said members and adapted to be connected to the vehicle to be drawn, converging brace members arranged at each end of the separated members, guiding rods connected to the separated members and to the meeting ends of the brace members, tension and compression springs mounted upon said rods, collars upon the rods between the tension and compression springs and connected to the former, swingle trees, and diverging connecting links passing between the separated members and connecting the swingle trees with the collars.

In testimony whereof I have hereunto set my hand in presence of two subscribing witnesses.

WILLIAM E. WOODS.

Witnesses:
   GEORGE E. HARRIS,
   CHARLES SCHUAN.